3,536,698
SIMPLIFIED METHOD FOR ESTERIFICATION OF ANTIBIOTICS VIA CARBONATE ANHYDRIDE INTERMEDIATES
Robert R. Chauvette and Edwin H. Flynn, Indianapolis, Ind., assignors to Eli Lilly and Company, Indianapolis, Ind., a corporation of Indiana
No Drawing. Continuation-in-part of application Ser. No. 574,311, Aug. 23, 1966. This application Feb. 27, 1968, Ser. No. 708,518
Int. Cl. C07d 99/24
U.S. Cl. 260—239.1
5 Claims

ABSTRACT OF THE DISCLOSURE

Process for making penicillin and cephalosporin esters by treating the penicillin or cephalosporin acid with a haloformate of an alkanol, haloalkanol, phenol, or a benzyl alcohol in the presence of a tertiary amine and then warming the resulting carbonic acid anhydride intermediate to form the corresponding alkyl, haloalkyl, phenyl, or benzyl penicillin or cephalosporin ester; certain new penicillin esters, useful as intermediates in converting penicillin ester sulfoxides to desacetoxycephalosporin antibiotics; and cephalosporin esters useful for protecting the carboxyl groups thereof during subsequent molecule modification.

CROSS REFERENCE

This application is a continuation-in-part of our pending application, Ser. No. 574,311, filed Aug. 23, 1966 now abandoned.

INTRODUCTION

This invention relates to antibiotic substances. More particularly, this invention provides a novel process for preparing penicillin and cephalosporin esters, penicillin sulfoxide and cephalosporin sulfoxide esters, penicillin sulfone and cephalosporin sulfone esters. These esters, in general, have some antimicrobial activity per se, but are of primary interest in this invention as intermediates in that they can provide easily obtainable blocking groups which protect the carboxyl group on the thiazolidine or thiazine ring moieties of the respective penicillin or cephalosporin molecules from undesired side reactions when these penicillin or cephalosporin molecules are subjected to further chemical reactions to modify other portions of the molecules.

BACKGROUND OF THE INVENTION

Prior art processes for preparing esters of penicillin antibiotic substances through the carbonic acid anhydride intermediate route have always required that an extraneous added alcohol or phenol be added to the carbonic acid anhydride intermediate to react with and chemically displace the carbonic acid moiety from the penicillin to form the ester of the extraneous added alcohol or phenol. This invention provides a process which eliminates the necessity of adding the alcohol or phenol and gives the desired ester directly as the product.

"Penicillin" is a generic term applied to a group of antimicrobially active chemical compounds which can be represented by the following formula:

(I)
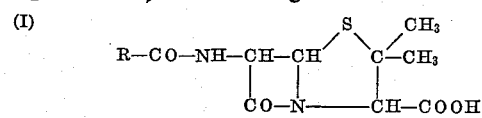

in which R represents an organic radical.

"Cephalosporin" is now employed as a generic term applied to a group of antimicrobials which can be represented by the following formula:

(II)
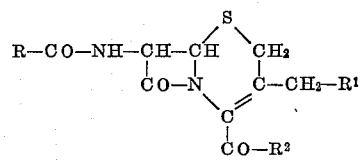

in which R represents an organic radical, $R^1$, taken alone, is —OH, —H, acetoxy, or tertiary-amino; $R^2$ is —OH when $R^1$ is —OH, $R^2$ is OH when $R^1$ is H, $R^2$ is —OH when $R^1$ is acetoxy; $R^2$ is —O⁻ when $R^1$ is tertiary-amino; and $R^1$ and $R^2$, when taken together, are —O—.

The first commercially important penicillin, penicillin G, having a benzyl group as the R group in Formula I above, is produced in conjunction with certain other penicillins by the culturing of a penicillin-producing mold of the group *Pencillium chrysogenum-notatum*. Many other penicillins, (e.g. the penicillin wherein R is phenoxymethyl, commonly referred to as penicillin V) can be produced by growing a penicillin-producing organism in a fermentation medium to which a precursor compound has been added to provide a source for the R group. A great number of penicillins have been produced by such addition of precursor compounds as illustrated by U.S. Pats. No. 2,479,295, 2,479,296 and 2,479,957.

Cephalosporin C, a valuable antibiotic having the formula:

(III)
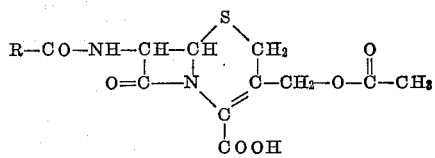

where R represents the D-4-amino-4-carboxy-n-butyl moiety, is produced simultaneously with cephalosporin N, a penicillin-type compound also known as Synnematin B or (D-4-amino-4-carboxy-n-butyl)-penicillin, by a species of Cephalosporin, e.g., as described in U.S. Pat. 3,093,638, issued June 11, 1963. Fermentation with an added precursor compound has been unsuccessful in producing other cephalosporins and many of the penicillins. It has been necessary, therefore, to devise synthetic chemical methods for preparing other penicillins and cephalosporins. These methods have generally proceeded through the isolation of the penicillin nucleus and through the chemical preparation of the cephalosporin nucleus from cephalosporin C (in which R—CO— of the above formulas is replaced with a hydrogen atom), followed by acylation of the nucleus with the appropriate acyl halide or mixed anhydride. The preparation of the penicillin nucleus (6-amino-penicillanic acid) is described in Doyle et al., U.S. Pat. 2,941,995 (June 21, 1960). [See also Kato, Journal of Antibiotics (Ser. A), 6, 130 (1953); and Journal of Antibiotics (Ser. A.), 6, 184 (1953); and Sakagouchi et al., J. Agr. Chem. Soc. (Japan), 23, 411 (1950).] The preparation of the cephalosporin nucleus (7-aminocephalosporanic acid and its variant forms as disclosed above) is described by Abraham and Newton in Belgian Pat. 593,777 (Aug. 31, 1960).

OBJECTS AND SUMMARY OF THE INVENTION

One aspect of the present invention provides improvement in the esterification technique which permits esterification of the penicillins or the cephalosporins under mild conditions, employing as the esterifying agent a haloformate corresponding to the desired ester moiety.

It is an object of this invention to provide a novel method for preparing penicillin and cephalosporin esters.

It is a further object of this invention to prepare penicillin and cephalosporin esters without the necessity of adding extraneous alcoholic or phenolic reagents.

Another object of this invention is to provide easily cleavable penicillin and cephalosporin esters in which the ester group serves as a protecting group for the carboxyl group.

Other objects, aspects and advantages of the invention will become apparent from the description which follows.

Briefly, by this invention, we have provided a process for preparing esters of penicillins and cephalosporins, which comprises commingling or mixing a penicillanic acid or cephalosporanic acid compound with an alkyl, haloalkyl, phenyl or benzyl haloformate, in a non-aqueous inert mutual solvent for the penicillanic or cephalosporanic acid compound in the presence of a tertiary amine acid acceptor at a temperature between about —10° C. and about 30° C. to form the corresponding carbonic acid anhydride intermediate, then raising the temperature of the resulting carbonic acid anhydride intermediate to a temperature sufficient to cause loss of carbon dioxide from the carbonic acid anhydride, and to obtain as product the alkyl, haloalkyl, phenyl or benzyl ester of the penicillin or cephalosporin. Recovery or isolation of the carbonic acid anhydride intermediate is optional. Those esters prepared by the method of this invention for carboxyl group protection, that is, the haloalkyl esters, such as the 2,2,2-trichloroethyl ester, can be cleaved with zinc in acidic acid solution by the method described by Woodward et al., J.A.C.S., 88, p. 852 (1966). The benzyl esters prepared by the method of this invention may be removed by hydrogenolysis methods known in the art. The 3,5-dimethoxybenzyl esters prepared by the method of this invention can be cleaved by hydrogenolysis or by the use of ultraviolet light. The para-methoxybenzyl esters of this invention may be cleaved by treatment of the ester with trifluoroacetic acid.

DETAILED DESCRIPTION OF THE INVENTION

The penicillin or cephalosporin starting material may be used in the form of free penicillanic or cephalosporanic acid or, in the form of any convenient ionizable salt thereof, such as the sodium or potassium salt of such acid. The amino group in the 6-position of the penicillanic acid or in the 7-position of the cephalosporanic acid should have an acyl group attached thereto. Any of the numerous acyl groups found in the prior-art penicillins, e.g., phenylacetyl in penicillin G, or phenoxyacetyl in penicillin V, and in the prior-art cephalosporins, e.g., thiophene-2-acetyl in cephalothin may be used as the starting materials for this invention. These acyl groups protect the amino groups of the respective penicillanic or cephalosporanic acid nuclei against reaction with the alkyl, haloalkyl, phenyl, or benzyl haloformate reactant. Of course, the penicillin nucleus (6-aminopenicillanic acid) and the cephalosporin nucleus (7-aminocephalosporanic acid and its variant forms as disclosed above) may be used in this process if there is no objection to acylating the amino group with the haloformate reactant. However, in such event, additional haloformate reactant would have to be used to accomplish the esterification purpose of this invention.

The penicillin or cephalosporin may be used in the free penicillanic acid or cephalosporanic acid form as described above, or may be used in the respective sulfoxide or sulfone forms in which the sulfur atom in the 1-position of either the penicillin or cephalosporin structure has bonded thereto 1 or 2 oxygen atoms. If the sulfoxide or sulfone form is to be used, the selected penicillin or cephalosporin is subjected in a preliminary step to treatment with an oxidizing agent according to the method of Chow, Hall, and Hoover, J. Org. Chem., 27, 1381 (1962), to produce the corresponding sulfoxide or sulfone:

(IV)
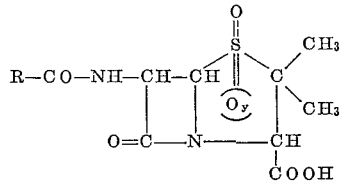

or (V)
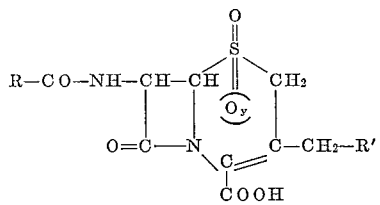

wherein R' is as defined above and wherein y is zero or 1, and R represents any organic radical found in penicillin and cephalosporin molecules including aliphatic, cycloaliphatic, and aromatic and heterocyclic radicals. For example, R may be a straight chain or branched chain, saturated or unsaturated aliphatic radical, exemplified by buten-1-yl, buten-2-yl, n-butyl, n-hexyl, $\Delta^8$-nonyl, allyl, and tert-butyl radicals. Additional aliphatic radicals which R may represent are those which contain as a member of the chain an interrupting group such as oxygen, sulfur, nitrogen and the like, for example, allyloxyalkyl and ethylmercaptoalkyl radicals. The carbocyclic-including radicals which R may represent include fully saturated and partially or completely unsaturated carbocyclic radicals, illustrative examples of which are the 5,6,7,8-tetrahydro-2-napthyl, cyclopentyl, and cyclohexen-3-yl radicals. Additional carbocyclic-including radicals are those wherein an aryl or cycloaliphatic hydrocarbon radical is attached to the carboxamido group in the 6 or 7 position by an aliphatic hydrocarbon group or by a group containing oxygen or sulfur in the chain. Illustrative examples of such radicals are the phenylmercaptomethyl, phenoxymethyl, styryl, and alpha-, alpha-dimethylphenoxymethyl radicals. The heterocyclic-including radicals which R may represent includes heterocyclic-including radicals wherein the heterocyclic nucleus is attached to the carboxamido group through an aliphatic group. An illustrative example is the alpha-(2-thienyl)ethyl radical.

Further specific examples of aliphatic, carbocyclic-including and heterocyclic-including radicals defining the R group in the penicillin and cephalosporin starting materials are the vinyl, ethoxy, cyclopentenyl, cyclohexyl, 2,4-dichlorobenzyl, 3,4-dichlorobenzyl, m-bromobenzyl, o-bromobenzyl, p-bromobenzyl, m-chlorobenzyl, o-chlorobenzyl p-chlorobenzyl, m-fluorobenzyl, o-fluorobenzyl, p-fluorobenzyl, p-iodobenzyl, p-nitrobenzyl, p-chlorophenoxymethyl, m-nitrobenzyl, o-nitrobenzyl, 3-chloro-4-bromobenzyl, m-trifluoromethylbenzyl, m-trifluoromethylphenoxymethyl, p-tolylmethyl, o-methylbenzyl, m-methylbenzyl, phenylmercaptobenzyl, p-methylmercaptobenzyl, o-methoxybenzyl, m-methoxybenzyl, o-methylphenoxymethyl, p-methoxyphenoxymethyl, p-cyanobenzyl, styryl, 3,4-dimethylbenzyl, beta-phenyl-butyryl, p-carbethoxyhydroxybenzyl, beta-naphthylmethyl, beta-naphthoxymethyl, 1-bromo-2-naphthylmethyl, 6-bromo-2-naphthylmethyl, 2-chloro-3-naphthylmethyl, 6-fluoro-2-naphthylmethyl, 1-nitro-2-naphthylmethyl, beta-naphthylmercaptomethyl, 6-methoxy-2-naphthylmethyl, p-phenoxybenzyl, p-biphenylylmethyl, p-isopropylbenzyl, and p-benzyloxybenzyl radicals.

Specific examples of such penicillin and cephalosporin starting materials are illustrated below.

benzyloxymethyl penicillin
(benzyloxyphenoxy)methyl cephalosporin
2-furylmethyl penicillin o-nitrophenoxymethyl cephalosporin
tert-butyl penicillin
ethyl-cephalosporin
styryl penicillin
benzyl cephalosporin
alpha-(p-tert-butyl)phenoxyethyl penicillin
phenylmercaptomethyl cephalosporin
o-tolylmercaptomethyl penicillin
m-tolylmercaptomethyl cephalosporin
p-tolylmercaptomethyl penicillin
m-chlorophenylmercaptomethyl cephalosporin
o-bromophenylmercaptomethyl penicillin
o-methoxyphenylmercaptomethyl cephalosporin
m-trifluoromethylphenylmercaptomethyl penicillin
benzylmercaptomethyl cephalosporin
phenylethylmercaptomethyl penicillin
n-butylmercaptomethyl cephalosporin
beta-phenoxyethyl penicillin
alpha-phenoxyethyl cephalosporin
alpha-(p-nitrophenoxy)-n-propyl penicillin
alpha-phenoxyisopropyl cephalosporin
alpha-phenoxyisobutyl penicillin
2-furylmethyl cephalosporin
beta-(2-furyl)ethyl penicillin
2-thienylmethyl cephalosporin
3-thienylmethyl penicillin
beta-(2-thienylethyl) cephalosporin
2-benzofurylmethyl penicillin
1-pyrazolemethyl cephalosporin
1,2,4-triazole-1-methyl penicillin
N-methyl-2-pyrrylmethyl cephalosporin
N-pyrrylmethyl penicillin
3-indolemethyl cephalosporin
3-benzothienylmethyl penicillin
phenylethyl penicillin
alpha-phenylethyl cephalosporin
gamma-(ortho-chlorophenyl)-n-propyl penicillin
alpha-aminobenzyl cephalosporin
cyclopentylmethyl penicillin
adamantylmethyl cephalosporin
alpha-naphthylmethyl penicillin
beta-naphthylmethyl cephalosporin
beta-nephthyloxymethyl penicillin and the sulfoxide and sulfone variants thereof.

A practical use for the method of this invention is the application of the method to prepare easily cleavable ester groups on the penicillin carboxyl group prior to converting penicillin sulfoxides to desacetoxy cephalosporins. A method for converting a penicillin sulfoxide to a desacetoxy cephalosporin has been described by Morin et al. in J.A.C.S., 85, p. 1896 (1963), but in such procedure Morin et al. employed ester groups such as the methyl ester which could not be removed easily in any commercially significant yield. By attaching easily cleaved ester groups such as the 2,2,2-trichloroethyl or benzyl groups on the penicillin carboxyl by the method of this invention, the method of Morin, et al. is made more useful for preparing improved antimicrobial agents.

When a sulfoxide or sulfone is being prepared, the penicillin or cephalosporin compound is commingled with a substance affording active oxygen, such as metaperiodic acid, peracetic acid, or other organic per-acid, or a salt thereof, hydrogen peroxide, iodosobenzene, or the like, in a proportion sufficient to supply from one to two atoms of active oxygen per atom of thiazolidine or thiazine sulfur. The terms "penicillin," "penicillanic acid," "cephalosporin," and "cephalosporanic acid" are used herein as including the use of the sulfoxide and sulfone variants of the starting materials for this invention.

Any haloformate reactant which will form a carbonic acid anhydride intermediate with the above described penicillins or cephalosporins and which carbonic acid anhydride will decarboxylate to the simple ester by heating may be used in practicing this invention. Haloformates of particular interest for this purpose include the alkyl and haloalkyl, particularly the chloroalkyl, bromoalkyl, and iodoalkyl chloroformates and bromoformates having from 2 to 6 carbon atoms in the alkyl or haloalkyl group as well as the benzyl haloformates. Specific examples of useful haloformates include the ethyl, n-propyl, isopropyl, n-butyl, isobutyl, tert.-butyl, amyl, and hexyl chloroformates and bromoformates, the chloroalkyl, bromoalkyl and iodoalkyl chloro- and bromoformates such as the 2-chloroethyl, 2,2,2-trichloroethyl, 2,2,2-trichloroethyl, 2,2,3-trichloropropyl, 2-chlorobutyl, 1,1-dimethyl-2,2,2-trichloroethyl, 2,2,3,4-tetrachloroamyl, and 2,2-dichlorohexyl chloroformates, 2,2-dibromoethyl, 2,2-dibromopropyl, 2,2,3-tribromobutyl, 2,2-dichloroamyl, as well as iodoethyl, 2-iodopropyl, and 2,2,3,4-tetrachlorohexyl bromoformates, and 2-iodohexyl chloro- and bromoformates. Benzyl, p-methoxybenzyl, o-methoxybenzyl, alpha-trichloromethylbenzyl, and phenyl chloroformate and benzyl and phenyl bromoformate can also be used.

The penicillin or cephalosporin in the acid or salt form and the selected haloformate are mixed in the cold, in the presence of any inert, non-aqueous solvent for the two reactants. A tertiary amine such as pyridine or a trialkylamine such as triethylamine or tributylamine is added as an acid acceptor (when the penicillin or cephalosporin is in the acid form) to take up the hydrogen halide given off as a by-product in the reaction. The reaction is conducted at low temperatures, preferably below room temperature. Temperatures of from −10° C. to about 30° C. are preferred. Lower temperatures can be used, depending upon the solvent, but are usually not necessary. Temperatures higher than about 30° C. during the intermediate formation interfere with the reaction somewhat and hence are not desirable.

Any non-aqueous liquid which acts to dissolve or disperse the penicillin or cephalosporin and haloformate reactants without decomposing them and which will permit the reaction to proceed smoothly can be used. The solvents of choice have boiling points below about 100° C. Examples of suitable materials useful as solvents or mixture of solvents include tetrahydrofuran, acetone, benzene, heptane, and dioxane-acetone mixture, etc.

When the carbonate anhydride formation step has proceeded substantially to completion, as may be evidenced by the amount of amine hydrohalide by-product collected, or by cessation of change of refractive index, the reaction mixture is warmed to a temperature sufficient to effect decarboxylation of the carbonate anhydride intermediate and to form the corresponding alkyl, haloalkyl, phenyl, or benzyl penicillin or cephalosporin ester product. If desired, the amine hydrohalide by-product can be removed from the reaction mixture before or following the warming step, but such is usually not necessary. The penicillin or cephalosporin carbonic acid anhydride intermediate solution may be allowed to warm by itself to room temperature and allowed to stand at that temperature until the decarboxylation has proceeded to the desired extent. However, it is usually preferred to warm the mixture for a shorter period of time below about 80° C., depending upon the ester being prepared and the diluent system used to complete the reaction. Temperatures above this tend to cause excessive by-product formation. It is usually not necessary to dispose of any evolved carbon dioxide, since the solvent used will ordinarily dissolve or absorb this by-product. No alcohol or phenol needs to be added to the reaction mixture of the process of this invention. The invention thus provides a more economical, simpler process than was previously known.

The invention is further illustrated by the following detailed examples.

EXAMPLE 1

Preparation of haloformate

To a solution of phosgene, 40 g. (400 millimoles), in 200 ml. of sodium-dried benzene there were added 2,2,2-trichloroethanol, 15.8 g. (106 millimoles), and pyridine, 12 g. (152 millimoles), in 200 ml. of dry benzene and 400 ml. of anhydrous ethyl ether dropwise with occasional cooling to keep the temperature slightly below 20° C. The addition required about 2 hours. The mixture was then stirred at room temperature for 2 hours. The pyridine hydrochloride by-product was filtered off. The filtrate, containing the desired 2,2,2-trichloroethyl chloroformate, was cooled, poured into 1 liter of ice-water, and shaken in a separatory funnel. The organic layer was separated, dried over anhydrous magnesium sulfate, and evaporated in a vacuum. Distillation of the organic layer over calcium carbonate gave 15 g. of 2,2,2-trichloroethyl chloroformate, B.P. 43° C./0.5 mm. Infrared carbonyl band: $5.62\mu$; $n_D^{25}$ 1.4698.

Preparation of ester

Phenoxyisopropyl penicillin sulfoxide (free acid form), 22.8 millimoles, was dissolved in 70 ml. of calcium hydride-dried tetrahydrofuran containing a mole equivalent of pyridine. The resulting mixture was stirred at ice-water temperature while a mole equivalent of 2,2,2-trichloroethyl chloroformate in 30 ml. of tetrahydrofuran was added dropwise. Pyridine hydrochloride precipitation was noted as soon as addition of the chloroformate began. The mixture was stirred in the cold for about 2 hours after the addition had been completed, and then stirred at room temperature for about 3 hours to insure complete reaction. The pyridine hydrochloride was filtered off, and the filtrate, containing the 2,2,2-trichloroethyl carbonic acid anhydride of phenoxyisopropyl penicillin sulfoxide, was heated briefly on the steam bath to effect decarboxylation to the 2,2,2-trichloroethyl ester. The solvent was removed in vacuo. The crude product which remained as residue was taken up in cold ethyl acetate for successive washes thereof with cold 5 percent hydrochloric acid solution, aqueous 5 percent sodium bicarbonate solution, and water. The washed ethyl acetate solution was dried over magnesium sulfate, concentrated under vacuum to a smaller volume, and diluted with an equal volume of petroleum ether. The desired 2,2,2-trichloroethyl phenoxyisopropyl penicillin sulfoxide ester crystallized from the solution at room temperature in over 50 percent yield, M.P. 138–141° C. There was no depression of melting point of a mixture of this 2,2,2-trichloroethyl phenoxyisopropyl penicillin sulfoxide with another sample prepared from phenoxyisopropyl penicillin sulfoxide and 2,2,2-trichloroethanol in the presence of dicyclohexylcarbodiimide. Similarly the nuclear magnetic resonance was satisfactory and identical with that for the same ester prepared by the carbodiimide method. The ester analysis was:

Analysis.—Calc'd. for $C_{20}H_{23}N_2O_6SCl_3$ (percent): C, 45.68; H, 4.41; N, 5.33. Found (percent): C, 46.23; H, 4.54; N, 5.30.

EXAMPLE 2

The procedure of Example 1 was repeated, except that benzyl penicillin sulfoxide (free acid form) was substituted for the phenoxyisopropyl penicillin sulfoxide in the carbonic acid anhydried formation step to form the benzyl penicillin sulfoxide trichloroethyl carbonic acid anhydride intermediate, which, upon decarboxylation by heating on a steam bath, gave the benzyl penicillin sulfoxide trichloroethyl ester.

EXAMPLE 3

7-(2-thienylacetamido)cephalosporanic acid monoisobutyl carbonic anhydride

A solution of 7-(2-thienylacetamido)cephalosporanic acid, 4 g. (10 mmole), in 15 ml. of a solvent mixture of dry dioxane and 20 ml. of analytical-grade acetone containing triethylamine, 1 g. (10 mmole), was cooled in an ice-alcohol bath. To this was added dropwise, a solution of isobutyl chloroformate, 1.37 g. (10 mmole.), in 10 ml. of acetone. The reaction mixture was kept near 0° C. for several hours, then poured into a stirred mixture of ice-cold water and chloroform. The organic layer was separated, washed successively with cold 5 percent HCl, 5 percent NaHCO$_3$ solution, and water, dried over magnesium sulfate, and evaporated. The residue was a neutral oil weighing about 1.6 g. When dissolved in tetrahydrofuran and diluted first with ether and then petroleum-ether, the oil gave 800 mg. of crystalline product; M.P. 114–116° C.

Analysis.—Calc'd. for $C_{21}H_{24}N_2O_8S_2$ (percent): C, 50.79; H, 4.87; N, 5.74. Found (percent): C, 50.67; H, 5.17; N, 5.62.

The structure was confirmed by nuclear magnetic resonance and ultraviolet spectra.

7-(2-thiopheneacetamido)cephalosporanic acid isobutyl ester

The 4-isobutyl ester is prepared from the above described carbonic acid ansydride intermediate by heating it in tetrahydrofuran for a time sufficient to drive off carbon dioxide therefrom.

EXAMPLE 4

7-(2-thiopheneacetamido)cephalosporanic acid monoethyl carbonic acid anhydride

A solution of 7 - (2 - thiopheneacetamido)cephalosporanic acid in 210 ml. of dry tetrahydrofuran containing triethylamine, 4 g. (40 mmole), was cooled in an ice-alcohol bath. Ethyl chloroformate, 4.3 g. (40 mmole), in 40 ml. of the same solvent was added dropwise. The reaction mixture was stirred and kept cold for one hour. The solvent was evaporated and the residue dissolved in chloroform. The cooled chloroform solution was washed successively with cold 5 percent HCl, 5 percent NaHCO$_3$ solution, and water, then dried over magnesium sulfate, and evaporated. The residue was a light-yellow oil weighing about 10 g. The ultraviolet spectrum of the neutral product showed little absorption in the region of 260–270 m$\mu$. Two recrystallizations from carbon tetrachloride gave 3.5 g. of the 7-(2-thiopheneacetamido)cephalosporanic acid monoethyl carbonic acid anhydride product with a metling point of 97–98° C.

Analysis.—Calc'd. for $C_{19}H_{20}N_2O_8S_2$ (percent): C, 48.71; H, 4.30; N, 5.98. Found (percent): C, 49.41; H, 4.22; N, 5.95.

The structure was confirmed by ultraviolet absorption spectrum.

7-(2-thiopheneacetamido)cephalosporanic acid ethyl ester

The 4-ethyl ester of the 7-(2-thiopheneacetamido) cephalosporanic acid is obtained by heating the above ethyl carbonic acid anhydride in an anhydrous tetrahydrofuran to a temperature sufficient to effect the evolution of carbon dioxide.

EXAMPLE 5

The procedure of Example 1 is repeated except that in the haloformate preparation step, 2,2-dichloroethanol is substituted for the trichloroethanol and two mole equivalents of triethylamine are used in place of the pyridine to form the 2,2-dichloroethyl chloroformate, which is reacted in the carbonic acid anhydride formation step with phenoxymethyl penicillin sulfoxide.

The carbonic anhydride intermediate formed thereby is decarboxylated by heating it for about 15 minutes admixed with the solvent on a steam bath to obtain the 2,2-dichloroethyl ester of phenoxymethyl penicillin sulfoxide.

EXAMPLE 6

A 7 g. (11.2 mmoles) portion of 6-[N-(2,2,2-trichloroethylcarbonyl) - D - phenylglycyl]aminopenicillanic acid sulfoxide was dissolved in 85 ml. of dry tetrahydrofuran containing 1.77 g. (22.3 mmoles) of pyridine. The solution was cooled in an ice-alcohol bath and stirred while 3.6 g. (16.7 mmoles) of 2,2,2-trichloroethyl chloroformate in 20 ml. of tetrahydrofuran were added. The mixture was stirred in the cold for two hours and then at room temperature for three hours to insure complete reaction. The 2,2,2-trichloroethyl carbonic acid anhydride of 6-[N-(2,2,2-trichloroethylcarbonyl) - D - phenylglycyl] aminopenicillanic acid sulfoxide solution thus obtained was heated to gentle reflux for fifteen minutes to form the 2,2,2 - trichloroethyl 6-[N-(2,2,2-trichloroethylcarbonyl)-D-phenylglycyl]aminopenicillanic acid sulfoxide ester. The solvent was removed under vacuum. The ester residue was taken up in cold ethyl acetate and successively washed with water, 5 percent sodium bicarbonate aqueous solution and with water again. The washed ethyl acetate solution of the ester was dried over magnesium sulfate and evaporated in a vacuum to give 5.2 g. of the crude 2,2,2-trichloroethyl 6 - [N - (2,2,2 - trichloroethylcarbonyl)-D-phenylglycyl]aminopenicillanic acid sulfoxide ester as an amorphous solid. Crystallization of this ester from 7 ml. of ethanol gave 4.5 g. (59 percent yield) of the purified 2,2,2 - trichloroethyl 6-[N-(2,2,2-trichloroethylcarbonyl)-D-phenylglycyl]aminopenicillanic acid sulfoxide ester product having a melting point of 180–182° C. Recrystallization of a 1 gram sample of the product from an ethanol-water mixture for analysis gave the pure ester, M.P. 185–6° C. Infrared and nuclear magnetic resonance spectra were in complete agreement with the ester structure.

*Analysis.*—Calcd. for $C_{21}H_{21}Cl_6N_3O_7S \cdot C_2H_5OH$ (percent): C, 38.45; H, 3.78; N, 5.85. Found (percent): C, 38.11; H, 3.56; N, 6.02.

The esterification method and the new esters of this invention are particularly useful for protecting carboxyl groups of penicillins during a series of chemical reaction steps taken to convert the penicillin to a desacetoxy cephalosporin by the method of Morin, et al., J.A.C.S., 85, p. 1896, (1963). For example, this esterification method has been used successfully to protect the carboxyl group in alpha-aminobenzyl penicillin sulfoxide during a series of chemical reactions to convert this penicillin to the corresponding alpha-aminobenzyl desacetoxy cephalosporin by the method of Morin, et al., cited above. The 2,2,2-trichloroethyl penicillanic acid ester was prepared through the carbonic acid anhydride intermediate as described in Example 6. The 2,2,2-trichloroethyl 6-[N-(2,2,2-trichloroethylcarbonyl)-D-phenylglycyl]aminopenicillanic acid sulfoxide ester, thus obtained, was rearranged to the "protected" desacetoxy cephalosporin by the Morin et al. method and then subjected to treatment with zinc and acetic acid to cleave the N-(2,2,2-trichloroethylcarbonyl)amide and the 2,2,2-trichloroethyl ester groups to form the desired alpha-aminobenzyl desacetoxy cephalosporin zwitterion salt which is an active antibiotic against Gram-positive and Gram-negative bacteria.

EXAMPLE 7

In 80 ml. of dry tetrahydrofuran containing 1.5 g. (20 mmoles) of pyridine there were dissolved 3.7 g. (10 mmoles) of phenoxymethyl penicillin sulfoxide. While cooling the solution, thus obtained, in an ice bath with stirring, there were added dropwise 2.56 g. (15 mmoles) of benzyloxycarbonyl chloride in 20 ml. of tetrahydrofuran. The resulting reaction mixture was stirred in the cold for two hours to form the intermediate benzyl carbonic acid anhydride of phenoxymethyl penicillin sulfoxide. The reaction mixture containing the carbonic acid anhydride was stirred at room temperature for three hours and heated to a gentle reflux for 15 minutes. The solvent was removed from the resulting mixture under vacuum. The residue was taken up in ethyl acetate, cooled, and washed successively with cold water, 5 percent sodium bicarbonate aqueous solution, and water. The washed ethyl acetate solution was dried over magnesium sulfate and concentrated to a small volume under vacuum, then diluted with petroleum ether, and refrigerated to promote crystallization. The white crystalline benzyl phenoxymethyl penicillin sulfoxide ester which resulted was triturated with anhydrous ethyl ether to effect purification. The benzyl phenoxymethyl penicillin sulfoxide had a melting point of 122°–124° C. (M.P. 123°–125° C., A. W. Chow, et al., J. Org. Chem., 27, p. 1381 (1962)). Infrared and nuclear magnetic resonance spectra were consistent with this ester structure.

EXAMPLE 8

A 250 ml. round bottom, three necked flask equipped with stirrer, pressure-equalizing dropping funnel, and a condenser to which was attached a calcium chloride containing drying tube was charged with 3.7 g. (0.01 mole) of penicillin V (phenoxymethyl penicillin) sulfoxide, 25 ml. of dry benzene, and 1.6 g. (0.02 mole) of pyridine. The mixture was vigorously stirred and cooled in an ice-water bath at 10–15° C., while a solution of 2.6 g. (0.012 mole) of trichloroethyl chloroformate in 25 ml. dry benzene was added during 45 minutes. The mixture was stirred in the cold for another 45 minutes to insure complete reaction to form trichloroethyl carbonic acid anhydride of the penicillin V sulfoxide, and then was stirred at room temperature for 1 hour and finally at 70°–80° C., for 0.5 hour. The resulting dark red reaction mixture was filtered, washed with cold 50 ml. portions of 5 percent aqueous hydrochloric acid, 5 percent aqueous sodium bicarbonate, and water. The resulting washed benzene solution was filtered through anhydrous sodium sulfate to effect drying, and then concentrated under vacuum. A thin layer chromatogram of the residue (using silica gel and an ethyl acetate:benzene mixture in 2:3 volume ratio as developer) indicated the presence of the trichloroethyl ester along with a small amount of a colored impurity. Benzene was added to the residue to give a volume of about 5 ml. The solution was warmed on a steam bath and 30 ml. of ether were added. The gray solid that separated was filtered, washed with ether, and vacuum dried to give 3.0 g. (60 percent yield) of the purified trichloroethyl phenoxymethyl penicillin sulfoxide M.P. 142–144° C. This material was further purified by passing it through a "Florisil" column to give 2.82 g. of the pure trichloroethyl phenoxymethyl penicillin sulfoxide, M.P. 148–149° C.

EXAMPLE 9

Penicillin G 2,2,2-trichloroethyl ester

Penicillin G, potassium salt, 8.5 g. (22.8 mmole) was suspended in 100 ml. of dry acetone containing dry pyridine, 2.7 g. (34 mmole). The mixture was stirred in an ice-water bath during dropwise addition of 2,2,2-trichloroethyl chloroformate, 4.8 g. (22.8 mmole) in 30 ml. of acetone. Stirring and cooling was maintained for three hours. The mixture was then stored at room temperature overnight. The insoluble materials were filtered. The filtrate was heated briefly on the steam bath. Addition of 50 ml. of water caused the product 2,2,2-trichloroethyl benzylpenicillin ester to slowly crystallize. Yield: 7 g. (62 percent), M.P. 160–1°.

I.R. spectrum (in chloroform) showed a broad peak in the 5.5–5.7μ region for β-lactam and ester carbonyls, bands at 2.93μ for amide NH, 5.92μ for amide carbonyl and 6.62μ (broad) for amide II, a broad band in the region of 8.1–8.4μ for the ester grouping.

N.M.R. spectrum of the product (in DCCl$_3$) showed signals at 8.49τ for the gem dimethyls, at 6.41τ for the C–6 side-chain methylene, at 5.55τ for the C–3 proton, at 5.28τ for the methylene of the ester group, (coinciding signals) centered at 4.41τ for the C–6 and C–5 β-lactam protons, doublet centered at 3.75τ for the amide NH, and at 2.74τ for the aromatic protons.

*Analysis.*—Calcd. for $C_{18}H_{19}Cl_3N_2O_4S$ (percent): C, 46.41; H, 4.11; N, 6.02. Found (percent): C, 46.75; H, 4.27; N, 5.99.

EXAMPLE 10

Penicillin V 2,2,2-trichloroethyl ester

Penicillin V, 8.0 g. (22.8 mm.) was dissolved in 70 ml. of dry tetrahydrofuran containing dry pyridine, 1.8 g. (22.8 mm.). The mixture was stirred in an ice-water bath during dropwise addition of 2,2,2-trichloroethyl chloroformate, 4.8 g. (22.8 mm.) in 30 ml. of THF. Stirring and cooling was maintained for two hours. The mixture was stored at room temperature overnight. The solvent was evaporated in vacuo. The residue was taken up in cold ethyl acetate for successive cold washes with water, 5 percent sodium bicarbonate solution and then water. The ethyl acetate solution was dried (MgSO$_4$) and evaporated in vacuo. The residue 2,2,2-trichloroethyl phenoxymethylpenicillin ester was an oil weighing 9.8 g.

I.R. spectrum of this ester product (in chloroform) showed bands at 2.95, 5.5–5.7 region (broad), 5.92, 6.25, 6.62 (broad) and 8.1–8.4µ region (broad).

N.M.R. spectrum of this ester (in DCCl$_3$) showed signals at 8.33, 8.41, 5.40, 5.35, 5.19, (coinciding signals) centered at 4.28 and in the 3.2–2.4τ region.

Analysis.—Calcd. for C$_{18}$H$_{19}$Cl$_3$N$_2$O$_5$S (percent): C, 44.87; H, 3.97; N, 5.82. Found (percent): C, 44.39; H, 3.99; N, 5.24.

EXAMPLE 11

Penicillin G p-methoxybenzyl ester

Phosgene, 12.8 g. (130 mm.) was bubbled into 200 ml. of dry acetone in a Dry Ice-alcohol bath. p-Methoxybenzyl alcohol, 4.4 g. (32 mm.) and dry pyridine, 3.8 g. (48 mm.) in 100 ml. of acetone was added dropwise over a period of one hour. The mixture was stirred for an additional hour and placed under reduced pressure briefly to remove excess phosgene from the p-methoxybenzyl chloroformates solution.

Dry pyridine, 3.8 g. (48 mm.) and then penicillin G, potassium salt, 11.9 g. (32 mm.) were added. The mixture was stirred for 30 minutes and then in an ice-water bath for two hours, and then at room temperature overnight. The insoluble materials were filtered. The solvent was removed in vacuo. The residue was taken up in cold ethyl acetate for successive cold washes with water, 5 percent sodium bicarbonate solution and water. The ethyl acetate solution was dried (MgSO$_4$), evaporated in vacuo. The residue was an oil weighing 10 g. A sample of this oil was chromatographed over silica gel, using benzene as an eluent. Mid-fractions afforded a purified sample of the p-methoxybenzyl benzylpenicillin ester.

I.R. spectrum was characteristic of this penicillin ester: 2.90, 5.59, 5.7–5.9 (broad), 6.20, 6.66, 8.0–8.3 (broad), 8.5, 9.7 and 12.3µ.

EXAMPLE 12

Penicillin V p-methoxybenzyl ester

Following the procedure of Example 11, except that 11.2 g. (32 mmole) of penicillin V free acid was substituted for the penicillin G potassium salt, there was obtained as product, the p-methoxybenzyl phenoxymethylpenicillin ester. This product was an oil which weighed 12.3 grams.

I.R. spectrum of the product was characteristic of the penicillin ester: 2.9, 5.5–5.7 (broad), 5.90, 6.16, 6.59, 6.66, 8.0, 8.5, 9.7 and 12.2µ.

We claim:

1. A process which comprises mixing 7-(2'-thiopheneacetamido)cephalosporanic acid with ethyl chloroformate in the presence of a tertiary amine acid acceptor at a temperature between about −10° C. and about 30° C. in a nonaqueous solvent therefor to form the ethyl carbonic acid anhydride of 7 - (2' - thiopheneacetamido)cephalosporanic acid, and then warming the carbonic acid anhydride to a temperature below about 80° C. to form the ethyl ester of 7 - (2' - thiopheneacetamido)cephalosporanic acid therefrom.

2. A process which comprises mixing 7-(2'-thiopheneacetamido)cephalosporanic acid with isobutyl chloroformate in the presence of a tertiary amine acid acceptor at a temperature between about −10° C. and about 30° C. to form the isobutyl carbonic acid anhydride of 7-(2'-thiopheneacetamido)cephalosporanic acid, and warming the carbonic acid anhydride to a temperature below about 80° C. to form the isobutyl ester of 7 - (2'-thiopheneacetamido)cephalosporanic acid therefrom.

3. A process which comprises mixing a compound selected from the group consisting of phenoxyisopropylpenicillin, N-(2,2,2 - trichloroethyl carbonyl)-D-phenylglycylaminapenicillin, phenoxymethylpenicillin, phenylacetylpenicillin, and 7 - (2' - thiopheneacetamido)cephalosporanic acid and the sulfoxides of such compounds with a chloroformate or bromoformate of an alcohol which is an alkanol having from 2 to 6 carbon atoms, a benzyl alcohol, or a haloalkanol having from 2 to 6 carbon atoms, and wherein the halogen is chlorine, bromine or iodine in a non-aqueous inert solvent therefor in the presence of a tertiary amine acid acceptor at a temperature between about −10° C. and about 30° C. to form the corresponding carbonic acid anhydride, and then warming the resulting carbonic acid anhydride to a temperature below about 80° C. to form the alkyl, haloalkyl, or benzyl ester of the corresponding penicillin or cephalosporanic acid.

4. A process as described in claim 3 wherein phenoxymethylpenicillin sulfoxide acid is mixed with the chloroformate of a haloalkanol having from 2 to 6 carbon atoms and wherein the halogen is chlorine to form the haloalkyl carbonic acid anhydride of phenoxymethylpenicillin sulfoxide acid, and then the haloalkyl carbonic acid anhydride is warmed to a temperature below about 80° C. to form the haloalkyl ester of phenoxymethylpenicillin sulfoxide acid.

5. A process as described in claim 4 wherein phenoxymethylpenicillin sulfoxide acid is mixed with 2,2,2-trichloroethyl chloroformate to form the 2,2,2-trichloroethyl carbonic acid anhydride of phenoxymethylpenicillin sulfoxide acid, and then the carbonic acid anhydride is warmed to a temperature below 80° C. to form the 2,2,2-trichloroethyl ester of phenoxymethylpenicillin sulfoxide acid.

References Cited

FOREIGN PATENTS 1,491,655  7/1967  France.

NICHOLAS S. RIZZO, Primary Examiner

U.S. Cl. X.R.

260—243